US012662104B2

(12) United States Patent
Suh et al.

(10) Patent No.: US 12,662,104 B2
(45) Date of Patent: Jun. 23, 2026

(54) SYSTEM FOR MONITORING A TOWABLE TRAILER AND METHOD OF DETECTING POTENTIAL THERMAL EVENTS

(71) Applicant: HYUNDAI TRANSLEAD, San Diego, CA (US)

(72) Inventors: Tong Pil Suh, Northville, MI (US); Michael James Proulx, Hampstead, NH (US); James Sangyoung Oh, Irvine, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 225 days.

(21) Appl. No.: 18/101,798

(22) Filed: Jan. 26, 2023

(65) Prior Publication Data

US 2023/0234548 A1     Jul. 27, 2023

Related U.S. Application Data

(60) Provisional application No. 63/303,103, filed on Jan. 26, 2022.

(51) Int. Cl.
| | |
|---|---|
| *G07C 5/00* | (2006.01) |
| *B60T 17/22* | (2006.01) |
| *G07C 5/08* | (2006.01) |
| *G07C 5/10* | (2006.01) |

(52) U.S. Cl.
CPC .......... *B60T 17/226* (2013.01); *G07C 5/0816* (2013.01); *G07C 5/10* (2013.01)

(58) Field of Classification Search
CPC .......... B60T 17/226; B60T 7/20; B60T 17/22; G07C 5/0816; G07C 5/10; G07C 5/00; F16D 2066/001
USPC .......................................................... 701/29
See application file for complete search history.

(56) References Cited

U.S. PATENT DOCUMENTS

| | | | |
|---|---|---|---|
| 11,845,461 B2 | 12/2023 | Lee et al. | |
| 2018/0037210 A1* | 2/2018 | Hecker | B60T 17/22 |
| 2021/0139008 A1* | 5/2021 | DiGioacchino | B60T 8/1708 |

* cited by examiner

*Primary Examiner* — Shardul D Patel
(74) *Attorney, Agent, or Firm* — Knobbe, Martens, Olson & Bear, LLP

(57) ABSTRACT

Methods for detecting potential thermal events of a towable trailer and associated monitoring systems are provided. The method comprises the following steps, namely, first, obtaining at least one data set comprising a plurality of physical sensor inputs. The plurality of physical sensor inputs may comprise a brake chamber pressure input from the brake chamber sensor, a brake lining temperature input from the brake lining temperature sensor, and a wheel end temperature input from the wheel end temperature sensor, and other inputs from additional physical sensors. Second, transmitting at least one data set to an analytics engine. Third, selecting, with the analytics engine, a thermal risk value from a look-up table based on the data set. Fourth, comparing, with the analytics engine, the selected thermal risk value to a predetermined threshold. Fifth, generating, with the analytics engine, a thermal alert if the thermal risk value exceeds the predetermined threshold.

10 Claims, 8 Drawing Sheets

100

SYSTEM FOR MONITORING A TOWABLE TRAILER AND METHOD OF DETECTING POTENTIAL THERMAL EVENTS

CROSS REFERENCE TO RELATED APPLICATIONS

This application claims the benefit of U.S. Provisional Application No. 63/303,103 filed Jan. 26, 2022, which is hereby incorporated by reference in its entirety.

TECHNICAL FIELD

The present disclosure generally relates to towable trailers, and more particularly to systems for monitoring towable trailers and associated methods for detecting thermal events associated with the trailers via the subject monitoring systems.

BACKGROUND

Trailers attached to semi tractors for shipping of freight are main stays on the vehicular roadways and staples of the transportation and delivery of goods. Many such tractor trailer combinations cover a significant distance per trip delivery, which spans different climates, altitudes, and land topographies over the course of a shipment journey, as well as other external environmental changes.

The trailer industry has experienced increasing instances of thermal events originating with trailer hardware, wherein such components exceed the approximate 250 degrees Fahrenheit (F) temperature threshold. Multiple variables can contribute to such thermal events, including, but not limited to trailer tire pressures, debris present in the trailer wheel bearing wells, inadequate wheel bearing lubrication, improper trailer brake engagement, and other trailer component maintenance failures. In ideal conditions, trailer components such as wheel end assemblies or more particularly wheel bearings operate from about 160 degrees Fahrenheit (F) to about 175 degrees Fahrenheit (F). Such components are at risk for a potential thermal event, if the same approach or exceed about 250 degrees Fahrenheit (F).

As such, there is a need for improved monitoring systems for trailers as well as methods of early detection of a potential thermal event.

SUMMARY

The present disclosure is directed to systems for monitoring a towable trailer and associated methods for detecting potential thermal events on such a trailer with the subject monitoring systems.

In one embodiment, the system for monitoring a towable trailer may comprise a brake chamber pressure sensor, a brake lining temperature sensor, a wheel end temperature sensor; a telematics modem unit, an analytics engine in fluid communication with the telematics modem unit, and a controller in fluid communication with each of the brake chamber pressure sensor, the brake lining temperature sensor, the wheel end temperature sensor, and the telematics modem unit. The controller may contain a memory that stores a set of computer executable instructions, and a processor configured to execute the computer executable instructions embodied in the memory, such that the controller is configured to execute the present method.

In a second embodiment, the system for monitoring a towable trailer may comprise a brake chamber pressure sensor, a brake lining temperature sensor, a wheel end temperature sensor, a brake diaphragm sensor; at least one microcontroller unit disposed on the towable trailer, and at least one primary control unit disposed on the towable trailer wherein the microcontroller unit is in fluid communication with each of the brake chamber pressure sensor, the brake lining temperature sensor, the wheel end temperature sensor, the brake diaphragm sensor, and the at least one primary control unit. The primary control unit may house an analytics engine and a Global Positioning System (GPS) unit. The primary control unit may also have a memory that stores a set of computer executable instructions, a processor configured to execute the computer executable instructions embodied in the memory.

An exemplary method compatible with the various embodiments of structure comprises the following steps. First, obtaining at least one data set comprising a plurality of physical sensor inputs. The plurality of physical sensor inputs may comprise a brake chamber pressure input from the brake chamber sensor, a brake lining temperature input from the brake lining temperature sensor, and a wheel end temperature input from the wheel end temperature sensor, and other inputs from additional physical sensors. Second, transmitting at least one data set to an analytics engine. Third, selecting, with the analytics engine, a thermal risk value from a look-up table based on the first data set. Fourth, comparing, with the analytics engine, the selected thermal risk value to a predetermined threshold. Fifth, generating, with the analytics engine, a thermal alert if the thermal risk value exceeds the predetermined threshold.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

Figure 1A:
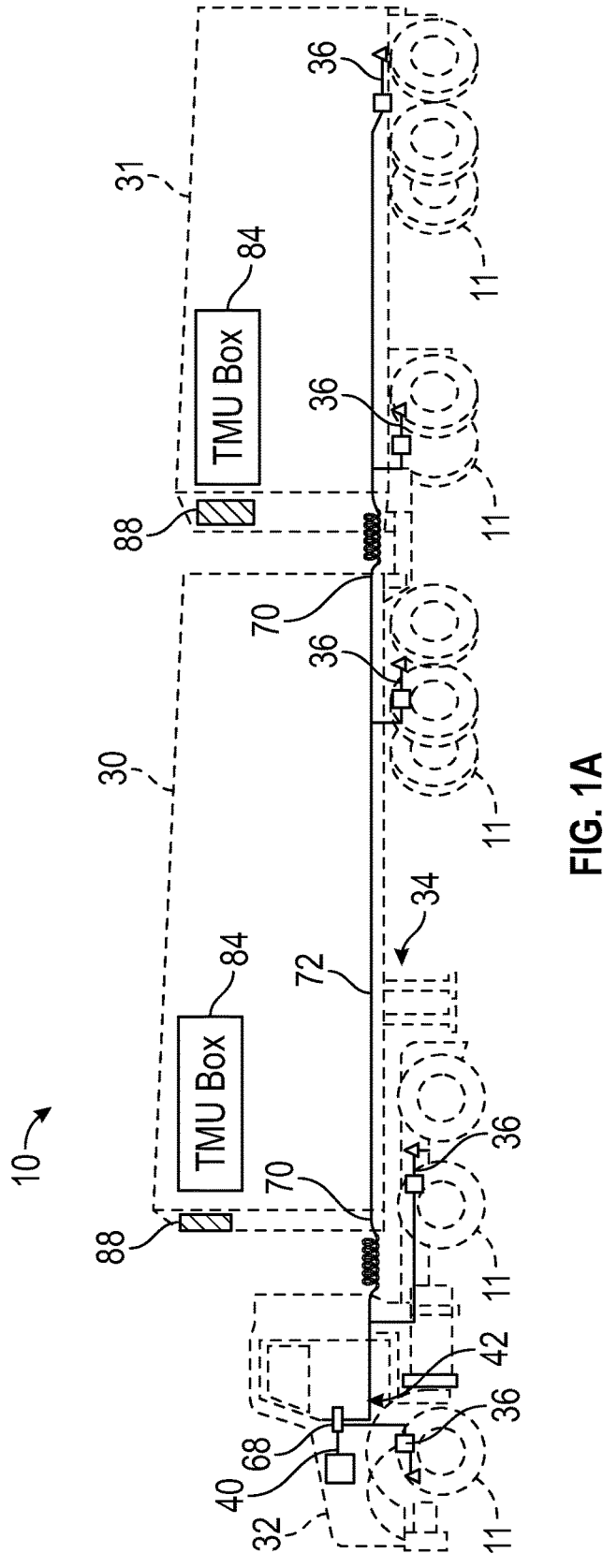
FIG. 1A is a schematic side perspective view of an example tractor trailer combination comprising a tractor, a towable trailer, and a PUP trailer, illustrating installation of an air brake system with which an exemplary monitoring system and associated method of detection may be used.

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. In addition, the term "proximal" refers to a direction that is nearer and the term "distal" refers to a relative position that is further away. Thus, the terms proximal and distal may be understood to provide generally opposing terms to describe relative spatial positions.

In a general sense, the present disclosure provides systems 10, 90 for monitoring a towable trailer 30 and associated methods 100, 300 for detecting a potential thermal event on such a trailer 30 with the subject monitoring systems 10, 90. Said another way, by obtaining a plurality of physical sensor inputs 12A, 12B, 12C, 12D, 12E, 12F, 12G and a set of connected data metrics 24A, 24B, 24C, 24D, 24E, 26A, 26B, 26C, 28A, 28B related to the towable trailer 30, the present methods 100, 300 are capable of detecting potential thermal incidents associated with the towable trailer 30 and notifying the driver or trailer operator prior to the occurrence of such a thermal incident via a visual indication on the trailer itself or via an alert displayed on the dash display or instrument panel of a coupled tractor 32.

More particularly, referring to FIGS. 1A-2B, a tractor 32, towable trailer 30, and PUP trailer 31 combination equipped with an air brake system 34 is illustrated. The tractor 32 and trailers 30, 31 are supported on wheels 11, the rotation of which may be slowed or stopped using pneumatically actuated brakes 36. Air brake systems 34 are commonly used in trucks, buses, trailers and semi-trailers, and are particularly beneficial in tractor/trailer combinations 32, 30, 31, as the use of air allows multiple vehicle units (the tractor 32, the towable trailer 30, and the PUP trailer 31) to be coupled, such that all units have braking capability and the brakes associated with each of the tractor 32, the towable trailer 30, and the PUP trailer 31 may be controlled by a trailer operator from the tractor cab. Moreover, the use of an air brake system 34 allows for the incorporation of an emergency braking system that utilizes parts of the service brake and parking brake systems.

Air brake system 34 may be considered as including an air pressurization and storage subsystem including a compressor 40, storage tanks 42 and air lines 68, 70, 72. The air storage tanks 42 are filled with compressed air by the compressor 40, which is powered by the tractor engine. When the driver or trailer operator steps on the brake pedal, or treadle valve, this allows air from the storage tanks 42 to flow into a brake chamber 48, via airlines 68, 70, 72 pushing a piston 50 down the brake chamber 48.

Figure 2A:
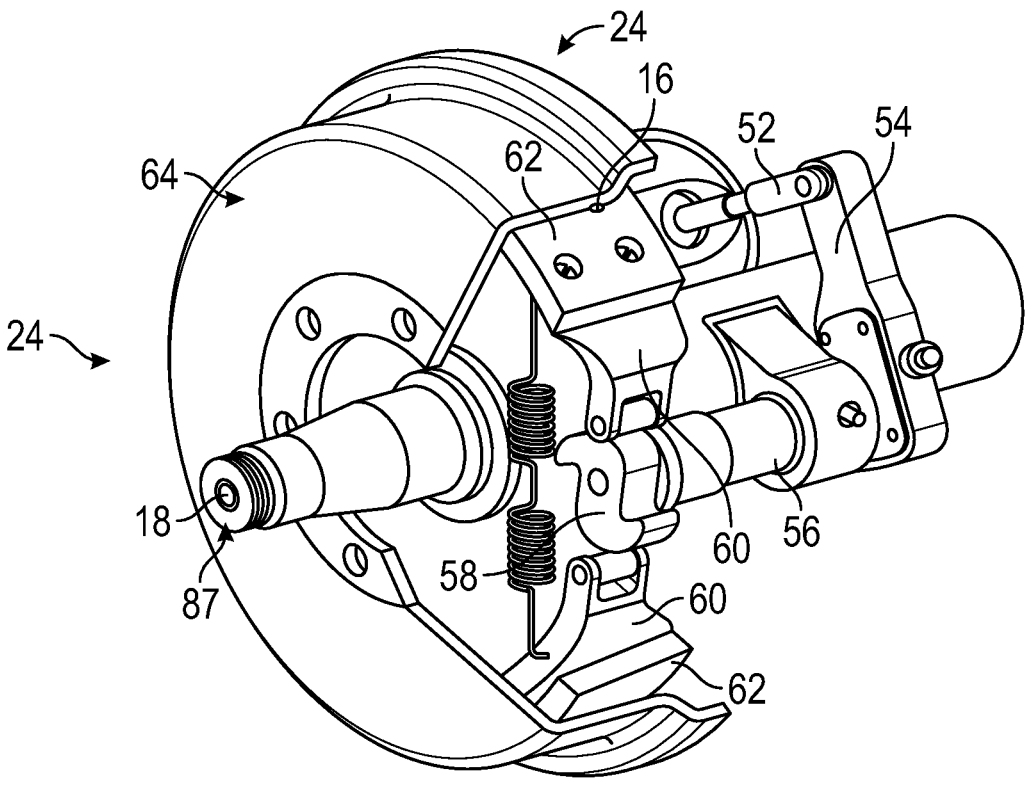
FIG. 2A is a schematic, partial cross-sectional, perspective view of the example air brake system with which the invention may be used.
Figure 2B:
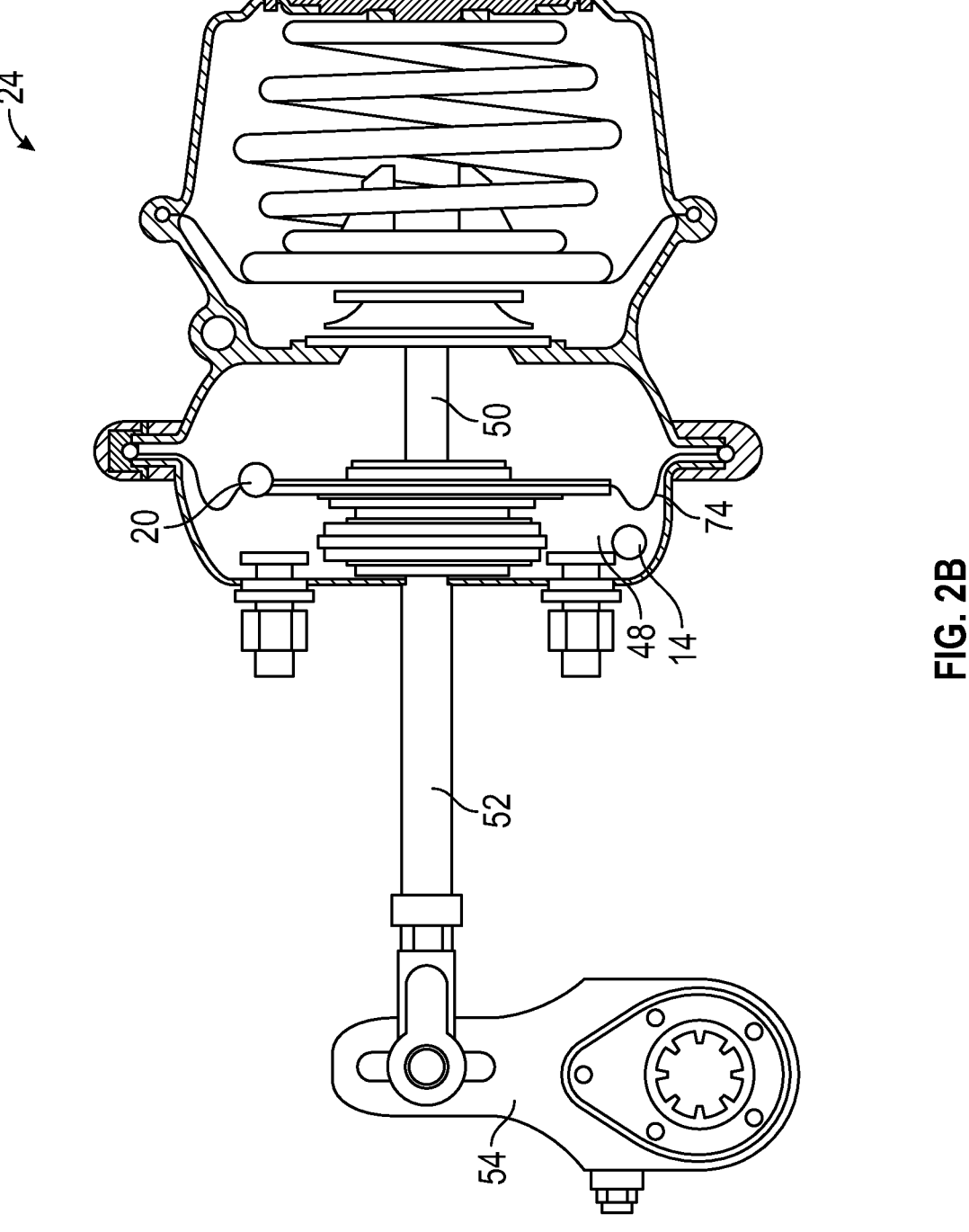
FIG. 2B is schematic cross-section view of a portion of the example air brake system with which the disclosure may be used.

There are several types of air brakes, including S-cam air brakes. While S-cam air brakes are shown in FIGS. 2A-2B, and are the most widely used type, the present disclosure may be utilized with any variety of air brake system 34. The piston 50 is attached to the push rod 52, which turns a slack adjuster 54. The slack adjuster 54 connects the push rod 52 to the brake cam shaft 56, which then rotates. This brake cam shaft 56 is connected to an S-cam 58. The S-cam 58 turns and pushes the brake shoes 60 against the brake lining 62 of a brake drum 64.

The systems 10, 90 of the present disclosure work with an air brake system 34 to monitor the same and evaluate or detect potential thermal events or fires associated with a respective trailer, which can originate in the brake system. While there are potentially multiple contributing factors to a potential thermal incident that may occur on a trailer 30, 31 factors identified through scientific evaluation and testing include, but are not limited to trailer tire pressure, debris, trailer maintenance and trailer brake engagement. As such there is a need for monitoring systems 10, 90 that are capable of monitoring physical sensor inputs with respect to the factors and analyzing the same to detect a potential thermal event and notify the trailer operator before such a thermal event occurs. The present disclosure aims to fill this need.

As detailed throughout the FIGS. 1A-5, the monitoring systems 10, 90 for a towable trailer may include a plurality of physical sensors disposed in the combined tractor/trailer 30, 31, 32 system to measure and evaluate certain physical characteristics at particular system locations. Such physical sensors may include, but are not limited to, at least one of each of a brake chamber pressure sensor 14 (FIG. 2B), a brake lining temperature sensor 16 (FIG. 2A), and a wheel end temperature sensor 18 (FIG. 2A). The system 10, 90 may also comprise one or more brake diaphragm position sensors 20 (FIG. 2B), a tire pressure monitoring sensor 21, at least one brake airline sensor 22, and an ambient temperature sensor 23.

In laboratory conditions, brake pads or brake lining 62 is vulnerable to a thermal event at from about 450 degrees Celsius (C) to about 500 degrees Celsius (C). Upon reaching such temperatures, in laboratory testing, thermal incident occurred as soon as 45 seconds after such temperatures of the brake lining 62 was reached. As such, it is important to monitor physical system components that could result in an increased temperature of the brake pad or brake lining 62.

Figure 5:
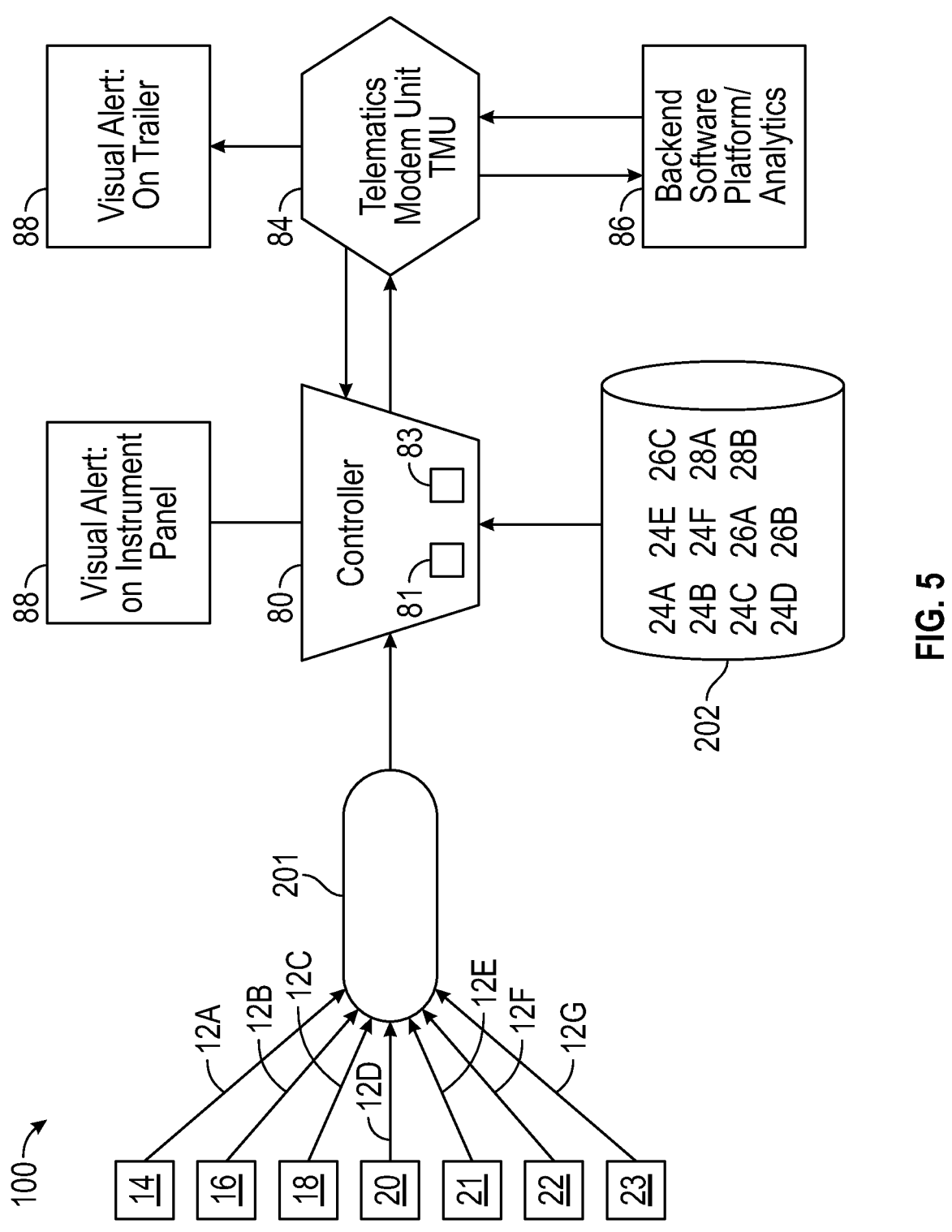
FIG. 5 is a logic diagram of the exemplary method(s) detailed in the flow charts of FIGS. 3 and 4.

The brake chamber pressure sensor 14 may be disposed in the brake chamber 48 to monitor an air pressure within the brake chamber 48. Decreased air pressure in the brake chamber 48 may result in an unintended increased engagement of the brake 24 on the respective trail axle, which can resultantly increase friction to the brake pad or brake lining 62, creating the potential for a thermal event. The at least one brake chamber pressure sensor 14 is configured to sense and measure the pressure inside the brake chamber 48 and send a signal to the controller representative of the measured pressure inside the brake chamber 48. The generated signal is defined as a brake chamber pressure input 12A (FIG. 5). In one example embodiment, the at least one brake chamber pressure sensor 14 comprises a first brake chamber pressure sensor associated with or disposed on the towable trailer 30 and a second brake chamber pressure sensor associated with or disposed on the PUP trailer 31.

The brake diaphragm position sensor 20 may be disposed in fluid communication with the brake diaphragm 74 to monitor the position thereof. When the driver or trailer operator steps on the brake pedal, or treadle valve, this allows air from the storage tanks 42 to flow into a brake chamber 48, via airlines 68, 70, 72 pushing a piston 50 down the brake chamber 48. As the piston 50 pushes down into the brake chamber 48 the diaphragm moves, namely further to the interior of the brake chamber 48, resultantly increasing the air pressure in the brake chamber 48. The at least one brake diaphragm position sensor 20 is configured to monitor the position of brake diaphragm and send a signal to the controller 80 representative of the measured position. The generated signal is defined as a brake diaphragm position input 12D (FIG. 5). In one example embodiment, the at least one brake diaphragm sensor 20 comprises a first brake diaphragm sensor associated with or disposed on the towable trailer 30 and a second diaphragm sensor associated with or disposed on the PUP trailer 31.

The brake airline sensor 22 may be positioned in fluid communication with airlines 68, 70, 72 and evaluate or measure the air pressure therein. The at least one brake airline pressure sensor 22 is configured to sense and measure the pressure inside the airlines 68, 70, 72 and send a signal to the controller 80 representative of the measured pressure inside the airlines 68, 70, 72. The generated signal is defined as a brake airline pressure input 12F (FIG. 5).

The brake lining temperature sensor 16 may be disposed in contact with the brake lining 62 to evaluate the temperature thereof. As indicated, decreased air pressure in the brake chamber 48 may result in an unintended increased engagement of the brake 24 on the respective trail axle, which can resultantly increase friction to the brake lining 62, creating the potential for a thermal event. The brake lining temperature sensor 16 is configured to evaluate the temperature of the brake lining and potentially detect such increased friction. The at least one brake lining temperature sensor 16 is configured to sense and measure the temperature of the brake lining 62 and send a signal to the controller 80 representative of the measured temperature. The generated signal is defined as a brake lining temperature input 12B (FIG. 5). In one example embodiment, the at least one brake lining temperature sensor 16 comprises a first brake lining temperature sensor associated with or disposed on the towable trailer 30 and a second brake lining temperature sensor associated with or disposed on the PUP trailer 31.

In addition to the increased temperature of the brake lining 62 being an indicator of a potential thermal event or incident, the increased temperature of a wheel hub at a wheel end or axle end on a towable trailer may likewise indicate a potential thermal event. Lack of wheel bearing lubrication, debris in the wheel bearing, excessive pre-load of the wheel bearing (over-tightening) can result in increased temperature of the wheel bearing and a potential thermal event. In laboratory conditions, wheel bearings are vulnerable to a thermal event at greater than about 250 degrees Fahrenheit (F). As such, it is important to monitor physical system components that could result in an increased temperature of the wheel bearing of wheel hub.

The wheel end temperature sensor 18 may be disposed within a wheel hub at a wheel end or axle end on a towable trailer 30. The wheel end temperature sensor 18 is configured to detect the temperature of a hub bearing of a wheel of a trailer 30, 31. The at least one wheel end temperature sensor 18 is configured to sense and measure the temperature of the hub bearing of a respective wheel and send a signal to the controller 80 representative of the measured temperature. The generated signal is defined as a wheel end temperature input 12C (FIG. 5).

In one example embodiment, the at least one wheel end temperature sensor 18 comprises a first wheel end temperature sensor associated with or disposed on the towable trailer 30 and a second wheel end temperature sensor associated with or disposed on the PUP trailer 31.

The tire pressure monitoring sensor 21 may be disposed at the wheel end in the respective tire and monitor the air pressure inside the tire. The at least one tire pressure monitoring sensor 21 is configured to sense and measure the pressure inside the tires and send a signal to the controller 80 representative of the measured pressure. The generated signal is defined as a tire pressure input 12E (FIG. 5).

The ambient temperature sensor 23 may disposed on the trailer 30, 31 and monitor the air temperature of the surrounding environment. The at least one ambient temperature sensor 23 is configured to sense and measure the temperature of the surrounding environment and send a signal to the controller 80 representative of the measured temperature. The generated signal is defined as ambient temperature input 12G (FIG. 5). In one example embodiment, the at least one ambient temperature sensor 23 comprises a first ambient temperature sensor associated with or disposed on the towable trailer 30 and a second ambient temperature sensor associated with or disposed on the PUP trailer 31.

In one example embodiment shown in FIG. 1A, the monitoring system 10 of the present disclosure may further comprise the controller 80 disposed within an engine control unit on the tractor 32. The controller 80 may include a non-transitory computer readable medium or a memory 81 and a processor 83 configured to execute the computer executable instructions embodied in the memory 81. Such a memory may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read, as well as networked versions of the same.

Databases or data stores described herein may include various kinds of mechanisms for storing, accessing, and retrieving various kinds of data, including a hierarchical database, a set of files in a file system, an application database in a proprietary format, a relational database management system (RDBMS), a non-relational database management system, a look-up table, etc. Each such database or data store is generally included within a computing device employing a computer operating system and may be accessed via a network in any one or more of a variety of manners.

The non-transitory computer readable medium or memory 81 stores or has written or embodied thereon at least one data module 85 containing a plurality of connected data metrics 24A, 24B, 24C, 24D, 24E, 26A, 26B, 26C, 28A, 28B related to the towable trailer 30 and the PUP trailer 31, and a set of computer executable instructions that comprise the present method 100. To effectuate the execution of the instructions of the present method, the controller 80 is in fluid communication with the components of the monitoring system 10 including the brake chamber pressure sensor 14, the brake lining temperature sensor 16, the wheel end temperature sensor 18, the brake diaphragm position sensors 20, the tire pressure monitoring sensor 21, the brake airline sensor 22, the ambient temperature sensor 23, an analytics engine 86 or backend software platform, and at least one telematics unit 84 disposed on the trailer 30, 31 containing all algorithms and logic to processes data inputs from the respective components to detect a potential thermal event for the trailer 30, 31.

The monitoring system 10 of the present disclosure may also comprise at least one telematics modem unit (TMU) 84.

The telematics modem unit (TMU) is in fluid communication with each of the controller 80 and the analytics engine 86 or backend software platform and serves as a data processing bridge therebetween. The at least one telematics modem unit 84 is disposed on at least one of the towable trailer 30 and the PUP trailer 31. In one example, as shown in FIG. 1A, a TMU 84 may be placed on each of the towable trailer 30 and the PUP trailer 31. More particularly, in one example embodiment, the at least one telematics modem unit (TMU) 84 may comprise a first telematics modem unit disposed on and connected to the towable trailer 30 and a second telematics modem unit disposed on and connected to a PUP trailer 31.

As detailed herein, the at least one a processor 83 is configured to execute the computer executable instructions embodied in the memory 81 of the controller 80, such that the memory 81 is configured to instruct the processor 83 to execute the associated method 100. The associated method 100 of monitoring a towable trailer 30, 31 and detecting a potential thermal event is detailed further in FIGS. 3-5 and comprises several steps 101-107 and sub-steps 102A-102B, 103A-103B, 104A-105B, 105A-105B, 106A-106B, 107A-107B.

Figure 3:
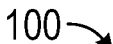
FIG. 3 is a flow chart detailing the steps of one exemplary method of detecting a potential thermal event, wherein the monitoring system comprises at least a tractor and a towable trailer.
Figure 3:
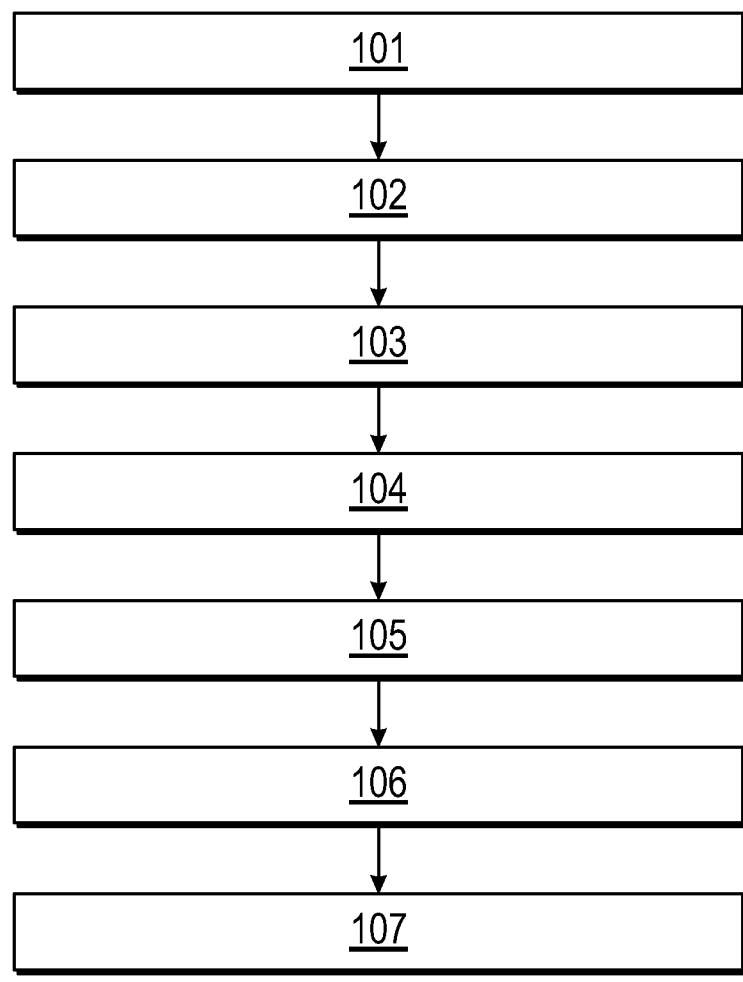
Figure 4:
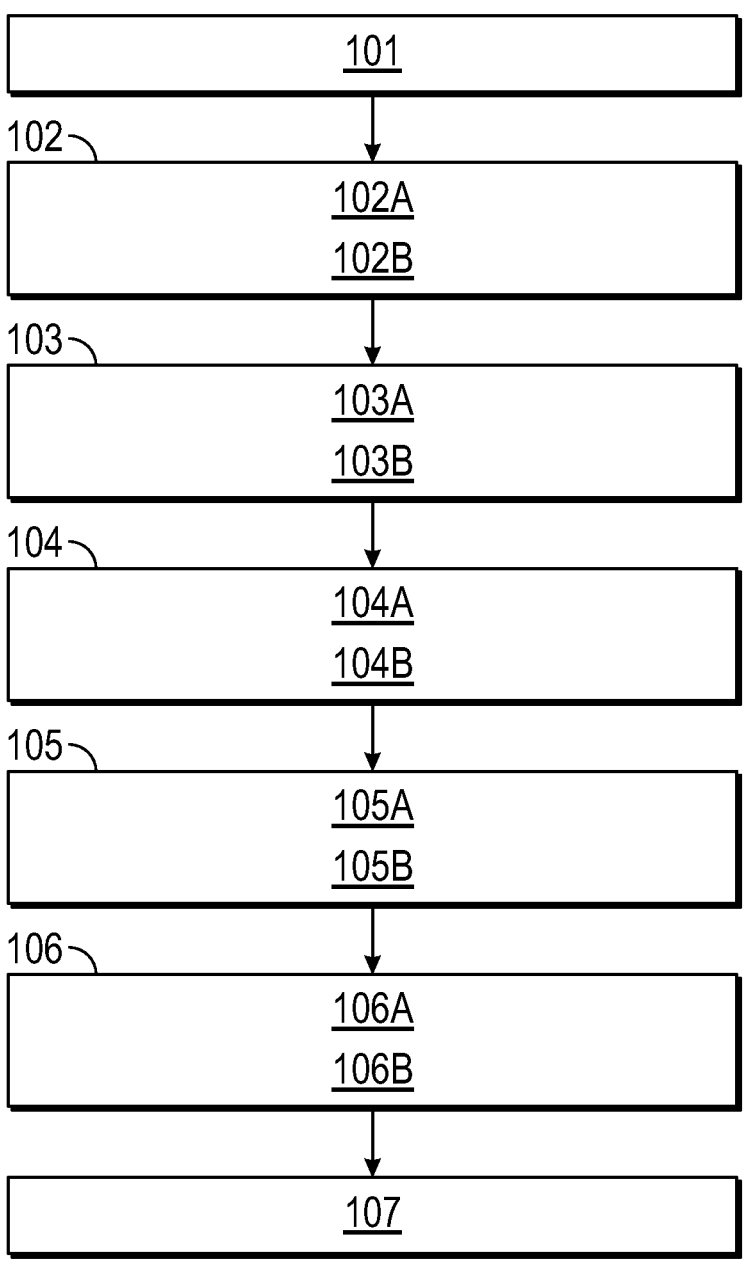
FIG. 4 is a flow chart further detailing the steps of the exemplary method of detecting a potential thermal event in FIG. 3, wherein the monitoring system further comprises the tractor, the towable trailer, and a PUP trailer.

Referring to FIGS. 3-5, at step 101, the controller 80 is configured to obtain a first data set 201 comprising a plurality of physical sensor inputs obtained from at least one of the brake chamber pressure sensor 14, the at least one brake lining temperature sensor 16, the at least one wheel end temperature sensor 18, the at least one brake diaphragm sensor 20, the at least one tire pressure monitoring sensor 21, the at least one brake airline sensor 22, and at least one ambient temperature sensor 23. More particularly, the controller 80 obtains at least one of a brake chamber pressure input 12A from the at least one brake chamber sensor 14, a brake lining temperature input 12B from the at least one brake lining temperature sensor 16, and a wheel end temperature input 12C from the at least one wheel end temperature sensor 18, a brake diaphragm position input 12D from the at least one brake diaphragm sensor 20, a tire pressure monitoring input 12E from the at least one tire pressure monitoring sensor 21, an airline pressure input 12F from the at least one brake airline sensor 22, and an ambient temperature input 12G from the at least one ambient temperature sensor 23.

In embodiments wherein the system includes both a towable trailer 30 and a PUP trailer 31, the controller will obtain a towable trailer first data set comprising a plurality of physical sensor inputs obtained from sensors 14, 16, 18, 20, 21, 22, 23 associated with or disposed on the towable trailer 30 and obtain a PUP trailer first data set comprising a plurality of physical sensor inputs obtained from sensors 14, 16, 18, 20, 21, 22, 23 associated with or disposed on the PUP trailer 31.

More particularly, the controller will obtain a first brake chamber pressure input 12A from the first brake chamber sensor 14 disposed on the towable trailer 30 and a second brake chamber pressure input 12A from the second brake chamber sensor 14 disposed on the PUP trailer 30, a first brake lining temperature input 12B from the first brake lining temperature sensor 16 disposed on the towable trailer 30 and a second brake lining temperature input 12B from the second brake lining temperature sensor 16 disposed on the PUP trailer 31, a first wheel end temperature input 12C from the first wheel end temperature sensor 18 disposed on the towable trailer 30 and a second wheel end temperature input 12C from the second wheel end temperature sensor 18 disposed on the PUP trailer 31, a first brake diaphragm position input 12D from the first brake diaphragm sensor 20 disposed on the towable trailer 30 and a second brake diaphragm position input 12D from the second brake diaphragm sensor 20 disposed on the PUP trailer 31, a first tire pressure monitoring input 12E from the first tire pressure monitoring sensor 21 disposed on the towable trailer 30 and a second tire pressure monitoring input 12E from the second tire pressure monitoring sensor 21 disposed on the PUP trailer 31, a first airline pressure input 12F from the first brake airline sensor 22 disposed on the towable trailer 30 and a second airline pressure input 12F from the second brake airline sensor 22 disposed on the PUP trailer 31, and a first ambient temperature input 12G from the first ambient temperature sensor 23 disposed on the towable trailer 30 and a second ambient temperature sensor input 12F from the second ambient temperature sensor 23 disposed on the PUP trailer 21.

Additionally, at step 101, the controller 80 will obtain a second data set 202 from a connected data module 85 written on the memory 81 of the controller, comprising a plurality of connected data metrics 24A, 24B, 24C, 24D, 24E, 26A, 26B, 26C, 28A, 28B. The connected data metrics may be grouped as environmental metrics 24A, 24B, 24C, 24D, 24E, trailer-related metrics 26A, 26B, 26C, and driver-based metrics 28A, 28B. More particularly, the second data set 202 may comprise environmental metrics such as an ambient temperature input 24A, an elevation input 24B, a location input 24C, a weather input 24D, and a road type input 24E, trailer-related metrics such as a trailer age input 26A, a trailer maintenance status input 26B, a trailer mileage input 26C, and driver-based metrics such as a speed input 28A and braking tendencies input 28B.

In embodiments wherein the system 10 includes both a towable trailer 30 and a PUP trailer 31, the environmental metrics 24A, 24B, 24C, 24D, 24E and the driver-based metrics 28A and 28B will be constant. However, the second data set 202 in such instance will include trailer-related metrics 26A, 26B, 26C for each of the towable trailer 30 and the PUP trailer 31, namely, each of a towable trailer age input, a PUP trailer age input, a towable trailer maintenance status input, a PUP trailer maintenance input, a towable trailer mileage input, and pup trailer mileage input.

At step 102, the controller 80 transmits the first data set 201 and the second data set 202 to the at least one telematics modem unit 84. In embodiments wherein the system 10 includes both a towable trailer 30 and a PUP trailer 31, step 102 is broken down into sub-steps 102A and 102B as shown in FIG. 4, namely, at sub-step 102A the controller 80 transmits the towable trailer first data set and the towable trailer second data set to the first telematics modem unit 84 disposed on the towable trailer 30 and at sub-step 102B the controller 80 transmits the PUP trailer first data set and the PUP trailer second data set to the second telematics modem unit 84 disposed on the PUP trailer 31.

At step 103, the at least one telematics modem unit 84 transmits the first data set 201 and the second data set 202 to the analytics engine 86 or backend software platform. In embodiments wherein the system 10 includes both a towable trailer 30 and a PUP trailer 31, step 103 is broken down into sub-steps 103A and 103B as shown in FIG. 4, namely, at sub-step 103A the first telematics modem unit transmits the towable trailer first data set and the towable trailer second data set to analytics engine 86 or backend software platform and at sub-step 102B the second telematics modem unit transmits the PUP trailer first data set and the PUP trailer second data set to the analytics engine 86 or backend software platform.

As detailed herein, an analytics engine 86 or backend software platform contains all algorithms and logic to process data inputs from the respective components to detect a potential thermal event for the trailer 30, 31. As such, at step 104 the analytics engine 86 assesses the first data set 201 and the second data set 202 and selects a thermal risk value from a look-up table based on the first data set 201 and the second data set 202. In embodiments wherein the system 10 includes both a towable trailer 30 and a PUP trailer 31, step 104 is broken down into sub-steps 104A and 104B as shown in FIG. 4, namely, at sub-step 104A the analytics engine 86 assesses the towable trailer first data set and the towable trailer second dataset and selects a towable trailer thermal risk value from a look-up table based on the towable trailer first data set and the towable trailer second data set. At sub-step 104B, the analytics engine 86 assesses the PUP trailer first data set and the PUP trailer second dataset and selects a PUP trailer thermal risk value from a look-up table based on the PUP trailer first data set and the PUP trailer second data set.

At step 105, the analytics engine 86 compares the selected thermal risk value to a predetermined threshold. In embodiments wherein the system 10 includes both a towable trailer 30 and a PUP trailer 31, step 105 is broken down into sub-steps 105A and 105B as shown in FIG. 4, namely, at sub-step 105A the analytics engine 86 compares the selected towable trailer thermal risk value to the predetermined threshold and at sub-step 105B the analytics engine 86 compares the selected PUP trailer thermal risk value to the predetermined threshold.

If the thermal risk values, namely the towable trailer thermal risk value and/or the PUP trailer thermal risk value does not exceed the predetermined threshold the analytics engine will take no further action. However, if the thermal risk value, namely, one or more of the towable trailer thermal risk value and/or the PUP trailer thermal risk value exceeds the predetermined threshold, at step 106, the analytics engine 86 generates a thermal alert and transmits the thermal alert via an electronic signal to the at least one telematics modem unit. In embodiments wherein the system 10 includes both a towable trailer 30 and a PUP trailer 31, step 106 is broken down into sub-steps 106A and 106B as shown in FIG. 4, namely, at sub-step 106A if the towable trailer thermal risk value exceeds the predetermined threshold, the analytics engine 86 generates a thermal alert and transmits the thermal alert via an electronic signal to the first telematics modem unit disposed on the towable trailer 30. At sub-step 106B, if the PUP trailer thermal risk value exceeds the predetermined threshold, the analytics engine 86 generates a thermal alert and transmits the thermal alert via an electronic signal to the second telematics modem unit disposed on the PUP trailer 31.

At step 107, upon receiving the thermal alert from the analytics engine 86, the respective telematics modem unit 84 sends a signal to notify the tractor driver or trailer operator of a potential thermal event associated with one or more of the trailers 30, 31. In one example, the respective telematics unit 84 may activate a thermal alert visual indicator (a light) on the trailer itself that may be seen by the driver or trailer operator from the tractor cab and notify the driver or trailer operator of a potential thermal even associated with one or more of the respective trailers 30, 31. In another example, the respective telematics unit 84 may send an electronic signal to the controller 80, which then activates a thermal alert visual indicator (a light) on the dash display or instrument panel of the tractor 32 visible to the driver or trailer operator and notify the driver or trailer operator of a potential thermal even associated with one or more of the respective trailers 30, 31. The visual indicator light may comprise one or more LED lights or the like. It is also contemplated that the visual indicator light may activate if the parking brake is engaged while driving.

Figure 1B:
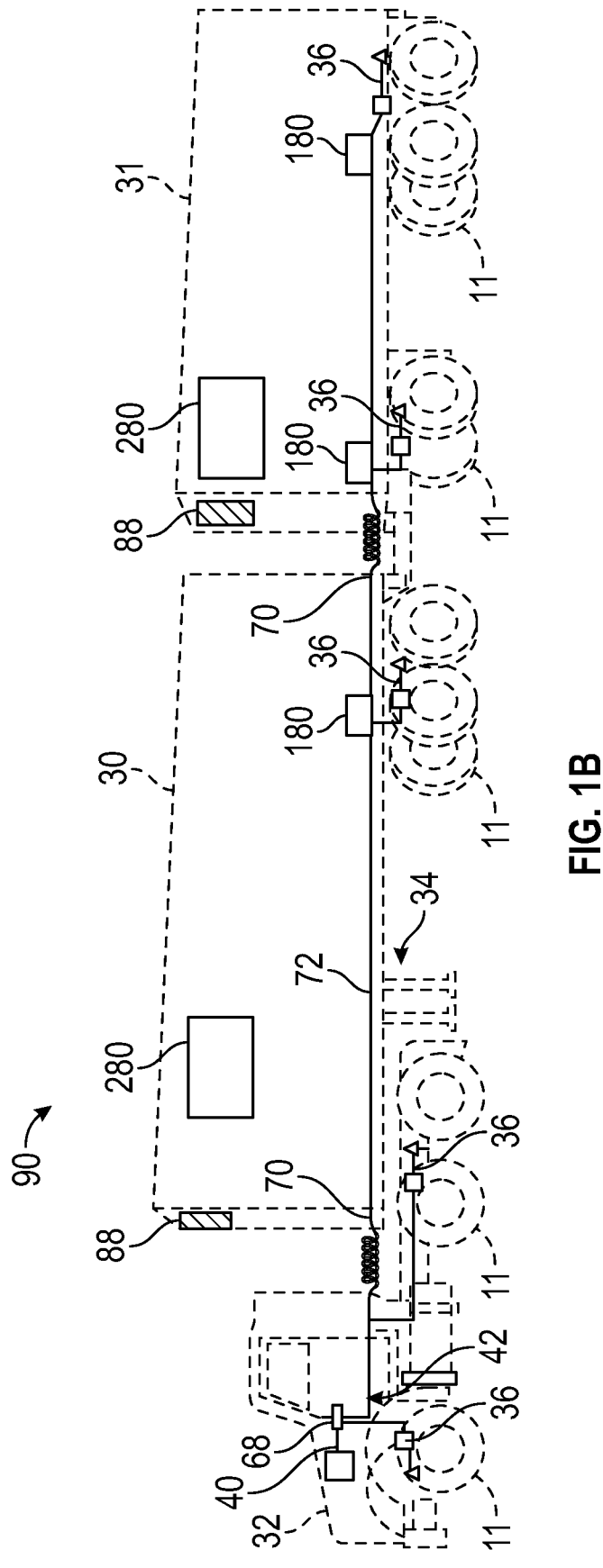
FIG. 1B is a schematic side perspective view of a second example tractor trailer combination comprising a tractor, a towable trailer, and a PUP trailer, illustrating installation of an air brake system with which a second exemplary monitoring system and associated method of detection may be used.

Turning now to FIG. 1B, in a second embodiment the monitoring system 90 may further comprise at least one microcontroller unit 180 and at least one primary control unit 280. The at least one microcontroller unit 180 and the at least one primary control unit 280 are disposed on at least one of the towable trailer 30 and PUP trailer 31. In one example, as shown in FIG. 1B, the at least one microcontroller unit 180 may comprise a first microcontroller unit disposed on and connected to the towable trailer 30 and a second and third microcontroller unit disposed on and connected to the PUP trailer 31. Additionally, the at least one primary control unit 280 may comprise a first primary control unit disposed on and connected to the towable trailer 30 and a second primary control unit disposed on and connected to the PUP trailer 31.

The microcontroller unit 180 is configured to obtain a first data set 201 comprising a plurality of physical sensor inputs obtained from at least one of the brake chamber pressure sensor 14, the at least one brake lining temperature sensor 16, the at least one wheel end temperature sensor 18, the at least one brake diaphragm sensor 20, the at least one tire pressure monitoring sensor 21, the at least one brake airline sensor 22, and the at least one ambient temperature sensor 23. More particularly, the microcontroller unit 180 obtains at least one of a brake chamber pressure input 12A from the at least one brake chamber sensor 14, a brake lining temperature input 12B from the at least one brake lining temperature sensor 16, a wheel end temperature input 12C from the at least one wheel end temperature sensor 18, a brake diaphragm position input 12D from the at least one brake diaphragm sensor 20, a tire pressure monitoring input 12E from the at least one tire pressure monitoring sensor 21, an airline pressure input 12F from the at least one brake airline sensor 22, and an ambient temperature input 12G from the at least one ambient temperature sensor 23. The microcontroller unit 180 transmits the first data set to the at least one primary control unit 280.

In embodiments wherein the system includes both a towable trailer 30 and a PUP trailer 31, the at least one microcontroller unit 180 of the towable trailer 30 and PUP trailer 31 will obtain a towable trailer first data set comprising a plurality of physical sensor inputs obtained from sensors 14, 16, 18, 20, 21, 22, 23 associated with or disposed on the towable trailer 30 and will obtain a PUP trailer first data set comprising a plurality of sensor inputs obtained from sensors 14, 16, 18, 20, 21, 22, 23 associated with or disposed on the PUP trailer 31. Furthermore, any one of the one or more microcontroller units 180 of the towable trailer 30 and PUP trailer 31 can obtain and transmit the first data set 201 to the at least one primary control unit 280, and any one of the one or more primary control units 280 of the towable trailer 30 or PUP trailer 31 can receive the data of the first data set 201 from any one of the microcontroller units 180. Said another way, any one of the microcontroller units 180 can transmit data to any one of the at least one primary control units 280; the primary control units 280 will sense the source of said sensory input data (e.g., whether it is from the towable trailer 30 or PUP trailer 31). Furthermore, the primary control units 280 are networked together and, as such, act as one entire system based on proximity to one another.

The at least one primary control unit 280 may house a non-transitory computer readable medium or memory, a processor configured to execute the computer executable instructions embodied on the memory, a GPS module to communicate with other primary control units (e.g., primary control units disposed on the PUP trailer 31), and an analytics engine containing all algorithms and logic to process data inputs from the respective components to detect a potential thermal event for the trailer 30, 31.

The non-transitory computer readable medium or memory may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read, as well as networked versions of the same. Databases or data stores described herein may include various kinds of mechanisms for storing, accessing, and retrieving various kinds of data, including a hierarchical database, a set of files in a file system, an application database in a proprietary format, a relational database management system (RDBMS), a non-relational database management system, a look-up table, etc. Each such database or data store is generally included within a computing device employing a computer operating system and may be accessed via a network in any one or more of a variety of manners.

As detailed herein, the processor of the at least one primary control unit 280 is configured to execute the computer executable instructions embodied in the memory of the primary control unit 280, such that the memory is configured to instruct the processor to execute the associated method 300. The associated method 300 of monitoring a towable trailer 30, 31 and detecting a potential thermal event is detailed in FIG. 6 and described in more detail herein below.

Figure 6:
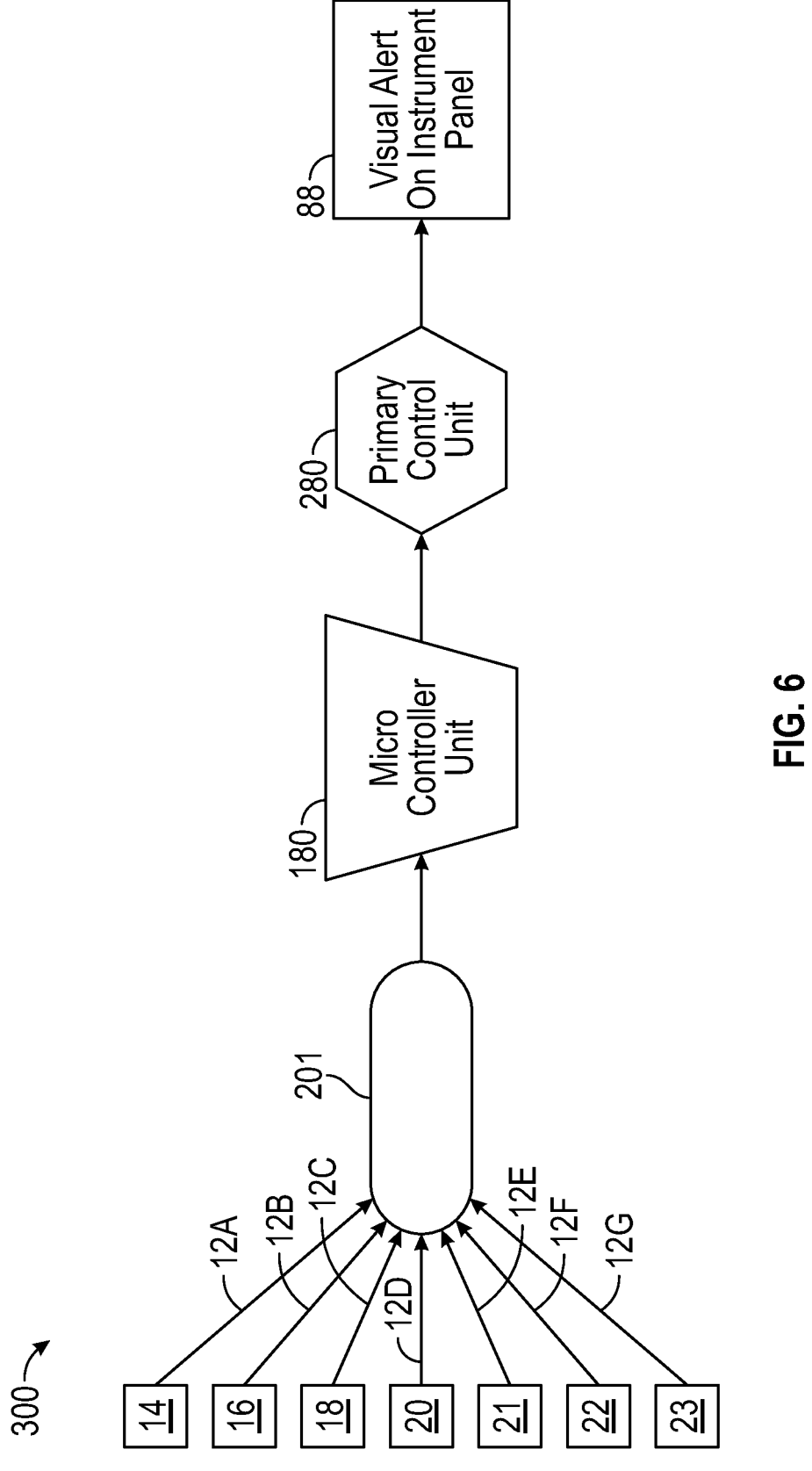
FIG. 6 is a logic diagram of another exemplary method of detecting a potential thermal event.

As shown in FIG. 6, the at least one microcontroller unit 180 is configured to obtain a first data set 201 comprising a plurality of physical sensor inputs 12A-12G obtained from sensors 14, 16, 18, 20, 21, 22, 23 associated with or disposed on the trailers 30, 31 as described herein above. The at least one microcontroller unit 180 transmits the first data set 201 to the at least one primary control unit 280. Next, the at least one primary control unit 280, housing an analytics engine 186 containing all of the algorithms and logic to process data inputs, assesses the first data set 201 and selects a thermal risk value from a look-up table based on the first data set.

In embodiments wherein the system 90 includes both a towable trailer 30 and a PUP trailer 31, the analytics engine of the at least one primary control unit 280 of the towable trailer 30 assesses the towable trailer first data set and selects a towable trailer thermal risk value from a look-up table based on the towable trailer first data set. Additionally, the analytics engine of the at least one primary control unit 280 of the PUP trailer 31 assesses the PUP trailer first data set and selects a PUP trailer thermal risk value from a look-up table based on the PUP trailer first data set. The analytics engine of the at least one primary control unit 280 then compares the selected thermal risk value(s) to a predetermined threshold. In embodiments wherein the system 90 includes both a towable trailer 30 and a PUP trailer 31, the analytics engine of the at least one primary control unit 280 compares the selected towable trailer thermal risk value to the predetermined threshold and the analytics engine 186 of the at least one primary control unit 280 compares the selected PUP trailer thermal risk value to the predetermined threshold.

If the thermal risk values, namely the towable trailer thermal risk value and the PUP trailer thermal risk value do not exceed the predetermined threshold, the analytics engine of the at least one primary control unit 280 will take no further action. However, if either one of the thermal risk value(s), namely, one or more of the towable trailer thermal risk value and/or the PUP trailer thermal risk value exceed the predetermined threshold, the analytics engine of the primary control unit 280 generates a thermal alert visual indicator (a light) on the trailer itself that may be seen by the driver or trailer operator from the tractor cab and notify the driver or trailer operator of a potential thermal event associated with one or more of the respective trailers 30, 31. In another example, the analytics engine of the primary control unit 280 may generate a thermal alert visual indicator (a light) on the dash display or instrument panel of the tractor 32 visible to the driver or trailer operator and notify the driver or trailer operator of a potential thermal event associated with one or more of the respective trailers 30, 31. The visual indicator light may comprise one or more LED lights or the like. It is also contemplated that the visual indicator light may activate if the parking brake is engaged while driving.

As such, through the use of the monitoring systems 10, 90 and associated methods of detection 100, 300 disclosed herein, drivers and trailer operators may be provided with advanced notice of a potential thermal event associated with one or more trailer components, such that the same may be addressed in advance of a thermal event or incident. More particularly, by obtaining a plurality of physical sensor inputs 12A, 12B, 12C, 12D, 12E, 12F, 12G related to the respective trailer 30, 31, the associated methods 100, 300 are capable of detecting potential thermal incidents associated with the towable trailer 30, 31 and notifying the driver or trailer operator prior to the occurrence of such a thermal incident via a visual indication on the trailer itself or via an alert displayed on the dash display or instrument panel of the tractor 32.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. A monitoring system for a towable trailer comprising:
a brake chamber pressure sensor;
a brake lining temperature sensor;
a wheel end temperature sensor;
a brake diaphragm sensor;
at least one microcontroller unit disposed on the towable trailer;
at least one primary control unit disposed on the towable trailer that houses an analytics engine and a Global Positioning System (GPS) unit, wherein the primary control unit has a memory that stores a set of computer executable instructions, a processor configured to execute the computer executable instructions embodied in the memory;
wherein the microcontroller unit is in fluid communication with each of the brake chamber pressure sensor, the brake lining temperature sensor, the wheel end temperature sensor, the brake diaphragm sensor, and the at least one primary control unit, such that the micro controller unit is configured to:
obtain at least one data set comprising each of a brake chamber pressure input from the brake chamber pressure sensor, a brake lining temperature input from the brake lining temperature sensor, a wheel end temperature input from the wheel end temperature sensor, and a brake diaphragm position input from the brake diaphragm sensor; and
transmit the first data set to the at least one primary control unit;
wherein the at least one primary control unit is configured to receive the first data set from the microcontroller unit; and
wherein the at least one primary control unit is configured to select a thermal risk value from a look-up table based on at least the first data set and compare the thermal risk value to a predetermined threshold, and wherein the primary control unit generates a thermal alert if the thermal risk value exceeds the predetermined threshold and transmits the thermal alert to an instrument panel, such the thermal alert is operative to alert a trailer operator.

2. The monitoring system of claim 1 further comprising:
a tire pressure monitoring sensor in fluid communication with the microcontroller unit;
a brake airline sensor in fluid communication with the microcontroller unit;
an ambient temperature sensor in fluid communication with the microcontroller unit; and
wherein the first data set further comprises a tire pressure monitoring input from the tire pressure monitoring sensor, an airline pressure input from the brake airline sensor, and an ambient temperature input from the ambient temperature sensor.

3. A monitoring system for a towable trailer comprising:
at least one brake chamber pressure sensor;
at least one brake lining temperature sensor;
at least one wheel end temperature sensor;
at least one telematics modem unit disposed on the towable trailer;
an analytics engine in fluid communication with the telematics modem unit;

a controller in fluid communication with each of the at least one brake chamber pressure sensor, the at least one brake lining temperature sensor, the at least one wheel end temperature sensor, and the at least one telematics modem unit, the controller having a memory that stores a connected data module and a set of computer executable instructions, and a processor configured to execute the computer executable instructions embodied in the memory, such that the controller is configured to:

obtain a first data set comprising a plurality of physical sensor inputs obtained from at least one of the at least one brake chamber pressure sensor, the at least one brake lining temperature sensor, and the at least one wheel end temperature sensor and a second data set obtained from a connected data module written on the memory;

transmit the first data set and the second data set to the at least one telematics modem unit;

wherein the at least one telematics modem unit is configured to receive the first data set and the second data set from the controller and transmit the first data set and the second data set to the analytics engine; and wherein the analytics engine is configured to select a thermal risk value from a look-up table based on the first data set and the second data set and compare the thermal risk value to a predetermined threshold; and wherein the analytics engine generates a thermal alert when the thermal risk value exceeds the predetermined threshold and transmits the thermal alert to the telematics modem unit such that the at least one telematics modem unit activates a thermal alert visual indicator, and wherein the at least one telematics modem unit transmits the thermal alert to the controller, such the thermal alert is operative to alert a trailer operator.

4. The monitoring system of claim 3 wherein the first data set comprises a brake chamber pressure input from the at least one brake chamber pressure sensor, a brake lining temperature input from the at least one brake lining temperature sensor, and a wheel end temperature input from the at least one wheel end temperature sensor.

5. The monitoring system of claim 4 further comprising at least one brake diaphragm sensor, at least one tire pressure monitoring sensor, at least one brake airline sensor, and at least one ambient temperature sensor each in fluid communication with the controller; and wherein the first data set further comprises a brake diaphragm position input from the at least one brake diaphragm sensor, a tire pressure monitoring input from the at least one tire pressure monitoring sensor, an airline pressure input from the at least one brake airline sensor, and an ambient temperature sensor input from the at least on ambient temperature sensor.

6. The monitoring system of claim 3 wherein the second data set comprises a trailer age input, a trailer maintenance status input, a trailer mileage input.

7. The monitoring system of claim 6 wherein the second data set comprises a speed input and braking tendencies input.

8. The monitoring system of claim 7 wherein the second data set comprises an ambient temperature input, an elevation input, a location input, a weather input, and a road type input.

9. The monitoring system of claim 4 wherein the system further comprises a PUP trailer coupled to the towable trailer, and wherein:

the at least one brake chamber pressure sensor comprises a first brake chamber pressure sensor associated with the towable trailer and a second brake chamber pressure sensor associated with the PUP trailer;

the at least one brake lining temperature sensor comprises a first brake lining temperature sensor associated with the towable trailer and a second first brake lining temperature sensor associated with the PUP trailer;

the at least one a wheel end temperature sensor comprises a first wheel end temperature sensor associated with the towable trailer and a second wheel end temperature sensor associated with the PUP trailer;

the at least one telematics modem unit comprises a first telematics modem unit disposed on and connected to the towable trailer and a second telematics modem unit disposed on and connected to a PUP trailer coupled to the towable trailer; and the controller is configured to:

obtain a towable trailer first data set comprising a plurality of physical sensor inputs obtained from at least one of the first brake chamber pressure sensor, the first brake lining temperature sensor, and the first wheel end temperature sensor associated with the towable trailer and obtain a PUP trailer first data set comprising a plurality of physical sensor inputs obtained from at least one of the second brake chamber pressure sensor, the second brake lining temperature sensor, and the second wheel end temperature sensor associated with the PUP trailer;

obtain a second data set obtained from a connected data module written on the memory;

transmit the towable trailer first data set and the second data set to the first telematics modem unit, wherein the first telematics modem unit is configured to receive the towable trailer first data set and the second data set from the controller, and transmit the PUP trailer first data set and the second data set to the second telematics modem unit, wherein the second telematics modem unit is configured to receive the PUP trailer first data set and the second data set from the controller;

wherein the first telematics modem unit is configured to receive the towable trailer first data set and the second data set from the controller and transmit the towable trailer first data set and the second data set to the analytics engine, and wherein the second telematics modem unit is configured to receive the PUP trailer first data set and the second data set from the controller and transmit the PUP trailer first data set and the second data set to the analytics engine;

wherein the analytics engine is configured to select a thermal risk value from a look-up table based on the towable trailer first data set and the second data set and compare the thermal risk value to a predetermined threshold, and wherein the analytics engine generates a thermal alert when the thermal risk value exceeds the predetermined threshold and transmits the thermal alert to the first telematics modem unit such that the first telematics modem unit activates a thermal alert visual indicator on the towable trailer, such the thermal alert is operative to alert a trailer operator; and wherein the analytics engine is configured to select a thermal risk value from a look-up table based on the PUP trailer first data set and the second data set and compare the thermal risk value to a predetermined threshold, and wherein the analytics engine generates a thermal alert when the thermal risk value exceeds the predetermined threshold and transmits the thermal alert to the second telematics modem unit such that the second telematics modem unit activates a thermal alert visual indicator on the PUP trailer, such the thermal alert is operative to alert a trailer operator.

10. The monitoring system of claim 9 wherein:

the towable trailer first data set comprises a brake chamber pressure input from the first brake chamber pressure sensor, a brake lining temperature input from the first brake lining temperature sensor, and a wheel end temperature input from the first wheel end temperature sensor;

the PUP trailer first data set comprises a brake chamber pressure input from the second brake chamber sensor, a brake lining temperature input from the second brake lining temperature sensor, a wheel end temperature input from the second wheel end temperature sensor; and the second data set comprises an ambient temperature input, an elevation input, a location input, a weather input, a road type input, a speed input and braking tendencies input, a towable trailer age input, a PUP Trailer age input, a towable trailer maintenance status input, a PUP trailer maintenance input, a towable trailer mileage input, and pup trailer mileage input.

* * * * *